United States Patent [19]
Brown

[11] Patent Number: 4,654,937
[45] Date of Patent: Apr. 7, 1987

[54] POSITIVE ACTION GATE CLIP

[76] Inventor: James E. Brown, 948 Jeannette Ave., Thousand Oaks, Calif. 91362

[21] Appl. No.: 817,477

[22] Filed: Jan. 8, 1986

Related U.S. Application Data

[63] Continuation of Ser. No. 604,885, Apr. 27, 1984, abandoned.

[51] Int. Cl.$^4$ .............................................. A44B 21/00
[52] U.S. Cl. ........................................ 24/523; 24/239; 24/241 SL; 24/242
[58] Field of Search .............. 24/241 R, 241 SL, 231, 24/230.5 R, 238, 239, 242, 374, 369, 370, 371; 604/885

[56] References Cited

U.S. PATENT DOCUMENTS

| | | | |
|---|---|---|---|
| 370,918 | 10/1857 | Armstrong | 24/239 |
| 499,615 | 6/1893 | Walker | 24/242 |
| 508,910 | 11/1893 | Bickle | 24/242 |
| 562,114 | 6/1896 | Benford | 24/371 X |
| 872,691 | 12/1907 | Seidl | 24/241 SL |
| 1,414,041 | 4/1922 | Pennington | 24/242 |
| 2,952,290 | 9/1960 | Gaspardo | 24/242 X |

FOREIGN PATENT DOCUMENTS

| | | | |
|---|---|---|---|
| 559311 | 3/1957 | Italy | 24/239 |
| 201369 | 4/1939 | Switzerland | 24/239 |
| 151421 | 9/1920 | United Kingdom | 24/242 |

Primary Examiner—Kenneth J. Dorner
Assistant Examiner—Laurie K. Cranmer
Attorney, Agent, or Firm—Fliesler, Dubb, Meyer & Lovejoy

[57] ABSTRACT

A positive action gate clip comprising a frame having at least two parallel opposing sections, at least one section being discontinuous so as to provide a lower section and an upper section with a gap thereinbetween, a rod-like gate element, and means for retracting the gate element into the frame, the frame upper and lower sections having openings therein so as to permit the coaxial insertion of the gate element into and through the upper section and into the lower section so as to form a gate across the gap thereinbetween, the retracting means permitting the partial withdrawal of the gate element from the frame so as to withdraw the corresponding portion of the gate element from the lower section and from across the gap between the upper and lower sections by the application of force parallel to the motion of the gate element and away from the frame.

7 Claims, 2 Drawing Figures

U.S. Patent    Apr. 7, 1987    4,654,937
Fig. 1.
Fig. 2.
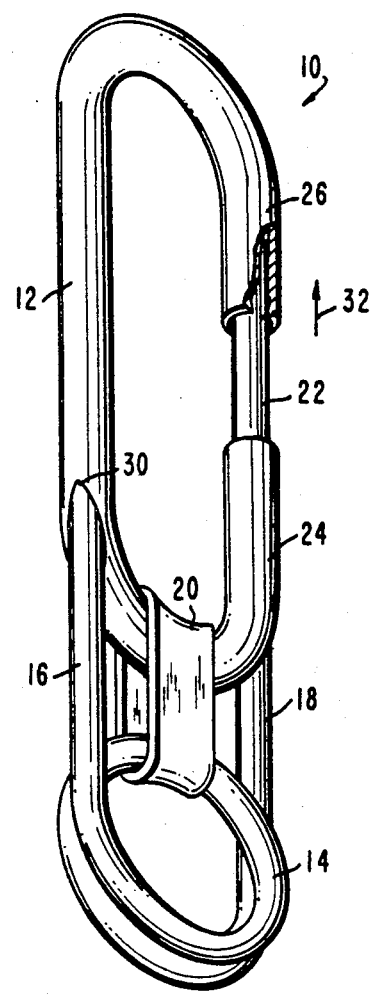
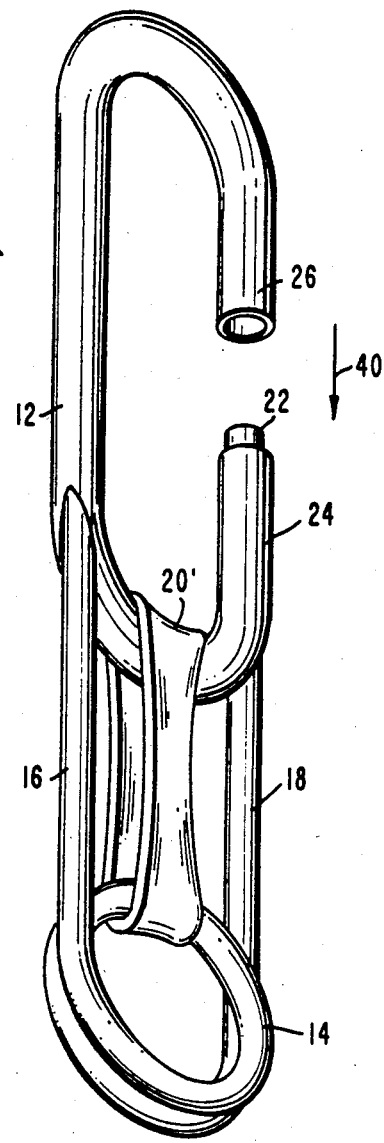

POSITIVE ACTION GATE CLIP

This is a continuation, of Ser. No. 604,885, filed Apr. 27, 1984, now abandoned.

BACKGROUND OF THE INVENTION

1. Technical Field

The present invention relates generally to clasps and hooks and, more particularly, to a clip characterized by the positive closure action of its sliding gate latch.

2. Description of the Prior Art

Clasps and hooks of various description are widely used to provide a simple point of attachment for loose articles, releasable tie points for load bearing ropes, chains and the like, and for many other common purposes. The design of such clasps and hooks reveal much about the times in which they were designed, the assumptions about how and the environments and circumstances in which they were intended to be used.

A review of the design of light to moderate weight bearing clasps and hooks, as classically illustrated by those shown in U.S. Pat. Nos. 154,360, 244,515, 771,956, 1,133,842, and 2,603,520 and French Patent No. 1,069,171, reveals a number of deficiencies in a design. Common sister hooks utilize the loading force to insure that the load is secured by the hook. However, this requires that the load force be completely released or countered before any part of the load can be removed or even to allow any additional load to be added.

Snap hooks typically utilize a compression driven slide or a spring flexed latch to effectively close a gap in a load bearing frame. The selective actuation capability of the slide or latch generally prevents the load from being freed unintentionally. While free loads can be easily added or removed and static loads positioned to bear only on the frame of the hook, dynamic loads, both in terms of force and direction, may allow a load bearing line to move and subsequently apply its load force fully on the slide or latch. Consequently, there is a substantial possibility that the load line will pull through the slide or latch and free the load, either directly or at its unattached abutment point with the frame. Even if it is protected, particularly in the case of a swinging latch, and prevented from swinging outward from the frame, the load force may be directed inward with respect to the frame in much the same direction as used when intentionally adding a load attaching line. Again, the result is an unintentionally freed load.

Various clasps utilize spring loaded bodies that slide over an otherwise exposed end point of a wire loop so as to effectively close the loop. While such clasps may be intended to bear loads, the strength of the spring often determines the maximum load that can be reliably secured, particularly when the load is likely to shift. A load exerted in part against the sliding body will tend to force it open, exposing the wire end point and consequently releasing the load unintentionally.

SUMMARY OF THE INVENTION

Therefore, a purpose of the present invention is to provide a clip that is completely functional in a wide variety of operating environments and that overcomes most, if not all, of the limitations of prior art devices.

This is accomplished in the present invention by a positive action gate clip comprising a frame having at least two parallel opposing sections, at least one section being discontinuous so as to provide a lower section and an upper section with gap therebetween, a rod-like gate element, and means for retracting the gate element into the frame, the frame upper and lower sections having openings therein so as to permit the coaxial insertion of the gate element into and through the upper section and into the lower section so as to form a gate across the gap therebetween, the retracting means permitting the partial withdrawal of the gate element from the frame so as to withdraw the corresponding portion of the gate element from the lower section and from across the gap between the upper and lower sections by the application of force parallel to the motion of the gate element and away from the frame.

Thus, an advantage of the present invention is that it is completely functional in low apparent and zero gravity environments and such other environments where the loading is intermittent or likely to shift.

Another advantage of the present invention is that load forces are born by either the frame of the present invention or applied perpendicular to the slide action direction of the gate.

A further advantage of the present invention is that the gate is supported at both ends so as to be as tolerent of load forces as is the frame.

Still another advantage of the present invention is that the gate is maintained positively closed, yet easily actuated by hand independant of the loading of the clip.

Yet another advantage of the present invention is that it is of a simple design requiring a minimum of parts and is thus economical to fabricate and maintain.

BRIEF DESCRIPTION OF THE DRAWING

Other attendant features and further advantages of the present invention will become apparent and readily understood by reference to the following Detailed Description of the Invention when considered in conjunction with the accompanying Drawing, wherein like reference numbers indicate like parts throughout the figures, and wherein:

FIG. 1 is a perspective view of the preferred embodiment of the present invention showing, partially in cut away load support of the gate slide end; and FIG. 2 another perspective view of the preferred embodiment of the present invention shown with the gate slide in its actuated position.

DETAILED DESCRIPTION OF THE INVENTION

Referring to FIG. 1, the preferred gate clip embodiment 10 of the present invention is shown. In general terms, however, the clip 10 is comprised of a frame 12, a gate control element 14, and a positive gate positioning element 20. Significantly, the frame 12 substantially forms a loop with a section removed so as to provide a gate opening therethrough. The gate opening is thereby defined by the opposing frame end sections 24, 26. The gate control element 14 includes a gate actuation arm 18 further associated with a gate 22 having a generally smooth surface. In particular, the arm 18 slidably extends through a portion of the frame 12 associated with the end section 24 such that the gate 22 may extend across the gate opening and be slidably inserted into a portion of the frame 12 associated with the opposing end section 26 thereof. The gate positioning element 20 is connected between opposing portions of the frame 12 and the gate control element 14 so as to effect the positive positioning of the gate 22 across the gate opening. That is, the gate positioning element 20 forcefully positions the gate control element 14 with respect to the frame 12 such that the arm 18 extends the gate 22 across the gate opening.

Referring now to FIG. 2, actuation of the gate clip 10' is accomplished by applying force so as to oppose and overcome the positive positioning force exerted by the gate positioning element 20'. The gate control element 14 is thereby displaced relative to the frame 12 such that the arm 18 withdraws the gate 22 from across the gate opening and substantially into the frame end section 24. Releasing the opposing force allows the gate positioning element 20' to return and positively maintain the gate 22 in its nominal position across the gate opening.

Loads are attached to the clip 10' typically by passing a section of a rope loop, or the like, through the gate opening and onto the frame 12. Thus, with the gate 22 in its nominal position, the frame 12 bears essentially all of the applied load force. Should the rope be repositioned onto the gate 22, as the result of some temporary or variable change in the environmental conditions, a sudden or otherwise reapplication of the load force cannot open the gate 22, regardless of the instantaneous direction of the force with regard to the position of the frame 12. Such a load force is necessarily almost entirely perpendicularly applied to the gate 22. Any parallel component of the load force is immediately released due to the smooth surface of the gate 22 and, in any case, is significantly less than that necessary to overcome the gate parallel component of the positive positioning force applied by the positioning element 20. Consequently, a particular advantage of the present invention is that the clip 10 functions to securely retain the load regardless of varying environmental conditions.

Again referring to FIG. 1, the preferred embodiment 10 of the present invention is generally intended for use in underwater environments such as encountered by a scuba diver. Thus, the clip frame 12 is preferably a corrosion resistant, oval shaped tube of smooth, integral construction, substantially as shown, and overall dimensions suitable for mounting on the weight belt, or the like, of the user. The gate control element 14 is preferably a solid, corrosion resistant rod formed to have a centered double loop and two parallel extending arms 16, 18. Arm entry holes 30, 32 ( 32 not shown ) are preferably provided at one end of the oval frame 12 to permit the slidable insertion of the rod arms 16, 18 into the long, straight sections of the frame 12. The gate opening is provided in one of these long, straight sections, substantially as shown. The corrosponding arm 18 is preferably of sufficient length so as to extend a gate 22 portion thereof across the gate opening and into the frame tube end section 26 when the gate control element 14 is in its nominal position. The second arm 16 is preferaby provided to stabilize and prevent the gate control element 14 from binding when the clip 10 is actuated. Consistant with this, the length of the arm 16 is selected as generally equal to that of the gate arm 18 to simplify design, construction, and any subsequent reassembly by the user as may be occasioned by the need to replace the positioning element 20. The double loop is preferred as providing a convenient point for the attachment of the positive retaining element 20 in the form of an elastic band. Preferably the elastic band 20 is a section of surgical rubber tubing, so chosen for its substantial elasticity and minimal aging characteristics even in harsh environments. The band 20 preferably loops around the end of the oval frame 12 associated with the holes 30, 32 and a single rod section of the gate control element 14, substantially as shown. The double loop is also preferred for the convenience that it affords for the application of manual clip actuating force when the loops are formed with a diameter suitable for the insertion of a thumb therethrough. The actuating force is thus obtained by a simple extention of the user's arm.

In practice, a stainless steel tube having an inside diameter of approximately 0.180 in. and a wall thickness of 0.035 in. forming an oval frame of approximately four inches mean length is preferred in combination with a gate control rod having an outside diameter of approximately 0.156 in. The rod is also preferably smooth surfaced, stainless steel. A surgical rubber tube of approximately 0.50 in. length, 0.312 in. inside diameter and 0.125 in. wall thickness is preferred for the band as providing an appropriate positive gate positioning force.

Thus, a positive action gate clip that is essentially insensitive to load forces applied in any direction to the gate and, thereby, capable of securely retaining the load regardless of changing environmental conditions has been described.

It should be understood, of course, that the foregoing dislosure relates only to the preferred embodiment of the present invention and that numerous modifications of the design and substitutions in the selection of the materials therefor may be made without departing from the nature and scope of the present invention. For example, other materials, such as Kelva TM, may be used in place of stainless steel. Also, other positive gate positioning elements, such as both tension and compression springs, can be used with appropriately different points of attachment. It is therefore to be understood that, within the scope of the appended claims, the present invention may be practiced otherwise than as specifically described.

I claim:

1. A positive action gate clip capable of releasably securing a load to a support comprising:
   (a) a tubular frame substantially forming a loop and having first and second parallel opposing tube sections, said frame having a gate element exit opening into said first tube section, said first tube section being discontinuous so as to provide a first tube portion having a first end opening and a second tube portion having a second end opening opposing said first end opening so as to define a gap thereinbetween;
   (b) a gate element having a major axis, and first and second parallel rod sections parallel to said major axis, each corresponding to a respective one of said first and second parallel opposing tube sections, the first corresponding one of said rod sections retractably extending into said first tube section via said gate element exit opening and through said second tube portion and into said first tube portion via said first and second end openings so as to form a retractable gate across the gap thereinbetween; and
   (c) means, coupled between an exterior surface of said frame and said gate element, for resisting the retraction of said gate element from across the gap and for permitting the partial withdrawal of said gate element from said first tube section and from across the gap between said first and second end openings in response to the application of force to said gate element in a direction parallel to said first rod section, whereby said retraction resisting means provides a retraction resisting force independent of any force applied to said clip and of the orientation of said frame and said gate element.

2. The clip of claim 1 wherein said resisting means elastically provides a gate closure force substantially parallel to said gate element.

3. The clip of claim 2 wherein said resisting means nominally maintains said gate element in extension into said second end opening of said frame.

4. The clip of claim 3 wherein said frame restrains said gate element from movement perpendicular to the major axis of said gate element at said first and second end openings.

5. The clip of claim 4 wherein said second end portion of said frame is hollow so as to permit the insertion of said gate element thereinto.

6. The clip of claim 5 wherein said frame is tubular and said gate element is cylindrical, so as to permit the coaxial insertion of said gate element into said second end portion of said frame.

7. A positive action gate clip for releasably securing a load to a support, said clip comprising:

(a) a frame substantially forming a loop and defining a gate opening delimited by opposing first and second end portions of said frame, said end portions having respectively opposing first and second end openings, said frame further having an exterior surface and an exit opening therethrough associated with said second end portion;

(b) a gate element slideably mounted within the second end portion of said frame so as to permit retractable extension of said gate element through said second end opening, across said gate opening and into said first end opening, thereby completing the loop of said frame, said gate element including an extension portion extending externally from said frame from within said second portion of said frame via said exit opening, said extension portion including a gate element attachment point located external to said frame; and (c) means for elastically resisting the retraction of said gate element from across said gate opening, said retraction resisting means being coupled between the attachment point of said gate element and an external surface of said frame.

* * * * *